United States Patent
Ruck et al.

(10) Patent No.: US 11,300,428 B2
(45) Date of Patent: Apr. 12, 2022

(54) SIGNAL PROCESSING ARRANGEMENT AND SIGNAL PROCESSING METHOD

(71) Applicant: ams AG, Premstaetten (AT)

(72) Inventors: Dominik Ruck, Graz (AT); Gerhard Oberhoffner, Seiersberg (AT)

(73) Assignee: AMS AG, Premstaetten (AT)

( * ) Notice: Subject to any disclaimer, the term of this patent is extended or adjusted under 35 U.S.C. 154(b) by 833 days.

(21) Appl. No.: 16/094,007

(22) PCT Filed: Apr. 12, 2017

(86) PCT No.: PCT/EP2017/058865
§ 371 (c)(1),
(2) Date: Oct. 16, 2018

(87) PCT Pub. No.: WO2017/186503
PCT Pub. Date: Nov. 2, 2017

(65) Prior Publication Data
US 2019/0113368 A1    Apr. 18, 2019

(30) Foreign Application Priority Data

Apr. 26, 2016 (EP) .................................. 16167069

(51) Int. Cl.
- G01D 5/24 (2006.01)
- G01D 5/244 (2006.01)
- G01D 5/245 (2006.01)

(52) U.S. Cl.
CPC ......... *G01D 5/2448* (2013.01); *G01D 5/2451* (2013.01)

(58) Field of Classification Search
CPC ............... G01D 5/2448; G01D 5/2451; G01D 5/24476; G01D 5/3473; G01D 5/142; G01D 5/145

(Continued)

(56) References Cited

U.S. PATENT DOCUMENTS

| | | |
|---|---|---|
| 2009/0174395 A1 | 7/2009 | Thomas et al. |
| 2010/0091926 A1* | 4/2010 | Kishibe ................ G01D 5/2448 375/371 |
| 2014/0347040 A1 | 11/2014 | Kawase |

FOREIGN PATENT DOCUMENTS

| | | |
|---|---|---|
| EP | 1672321 | 6/2006 |
| JP | 2008051507 A  * | 3/2008 |

(Continued)

OTHER PUBLICATIONS

European Patent Office, International Search Report for PCT/EP2017/058865, dated Jun. 16, 2017.

*Primary Examiner* — Tarun Sinha
*Assistant Examiner* — Matthew W. Baca
(74) *Attorney, Agent, or Firm* — MH2 Technology Law Group LLP

(57) ABSTRACT

In a signal processing arrangement a first and a second input signal associated with the rotating object are received at signal inputs. Amplitude processing blocks are connected to the signal inputs and each have an adjustable gain. A trigonometric processing block has inputs coupled to outputs of the second amplitude processing blocks via respective signal paths. The trigonometric processing block is configured to determine a magnitude value and a phase value based on signals at its inputs. The signal processing arrangement further has compensation blocks configured to store values at the inputs of the trigonometric processing block as respective peak values, when the phase value assumes a respective phase value. A gain value is determined by applying a respective regulation function to respective amplitude errors being based on the peal values, and the gains of the amplitude processing blocks are adjusted based on the respective gain values.

18 Claims, 4 Drawing Sheets

(58) Field of Classification Search
USPC .......................................................... 702/94
See application file for complete search history.

(56) References Cited

FOREIGN PATENT DOCUMENTS

| WO | WO-2012010507 A1 * | 1/2012 | ............. G01L 3/109 |
| WO | WO-2014075698 A1 * | 5/2014 | ............. G01P 21/02 |
| WO | 2006/015823 | 2/2016 | |

* cited by examiner

SIGNAL PROCESSING ARRANGEMENT AND SIGNAL PROCESSING METHOD

BACKGROUND OF THE INVENTION

The present disclosure relates to a signal processing arrangement and to a signal processing method, in particular for processing input signals associated with a rotating object, more particularly having sine shapes with a defined phase shift to each other.

Rotary encoders are used for determining angular positions of rotating objects. To this end such rotary encoders are usually built using a geometrical arrangement of magnetic field sensors like CMOS Hall elements, in conjunction with a magnetic source like a permanent magnet rotated above them. Such an arrangement allows the generation of two vectors with ideally 90° phase shift towards each other, expressed with sine-shaped sensor signals. For this reason such rotary encoders can also be called sine-cosine based rotary encoders.

When processing the raw sensor signals respective devices assume that sine and cosine channels have the same amplitude, have no offset signal and have no additional phase shift towards each other. However, in factual implementations these assumptions are usually not fully appropriate, which results in angular errors when determining the rotation angle of the rotating magnetic source. Various compensation schemes like current spinning or chopping techniques are performed in order to reduce the angular error. However, even under application of such compensation schemes errors, in particular non-linear errors, remain.

SUMMARY OF THE INVENTION

The present disclosure provides an improved concept for processing signals associated with a rotating object that improves the linearity for the determining of a rotation angle of the rotating object.

The improved concept is based on the idea that a main source of errors in calculation of a rotation angle is given by misalignment of magnetic field sensors like Hall sensors. For example, the two signals that ideally are orthogonal to each other are subject to amplitude deviations with respect to each other, which leads to errors when applying conventional trigonometric functions to these signals. To this end, according to the improved concept, amplitudes of the two input signals are subject to a regulation that is based on actual peak values in the sine shapes. In particular, the amplitudes of the two input signals are controlled to be coincident. This approach allows compensation of various effects that lead to the misalignment of amplitude, such as spatial misalignment, sensitivity variations between sensors, offsets and tilting of the rotating magnetic source or the like. For example, also drifts over time can be compensated with the improved concept. Accordingly, the linearity in determination of the rotation angle can be improved.

The improved concept may also include the option that also offset errors of the two input signals can be compensated for. For example, the peak values of the sine-shaped signals can be used to determine an actual offset for each input signal. Such an offset can be regulated out by applying an offset correction value in the corresponding signal path. This further improves the linearity of the angle determination.

As another option of the improved concept, a phase deviation of the two input signals can be compensated for by applying a phase correction to at least one of the signal paths, e.g. by controlling a delay for one or both of the signal paths.

Each of the three options according to the improved concept can be implemented or applied separately, as they do not directly depend on each other.

For example, an embodiment of a signal processing arrangement according to the improved concept comprises a first and a second signal input for receiving a first and a second input signal associated with a rotating object. For example, the first and the second input signal constitute a pair of sine-cosine signals retrieved from magnetic field sensors arranged below a rotating magnetic source associated with the rotating object. A first and a second amplitude processing block are connected to the first and the second signal input. The first and the second amplitude processing block each have an adjustable gain, in particular an individually adjustable gain. The signal processing arrangement further comprises a trigonometric processing block and a first and a second compensation block.

The trigonometric processing block has a first and a second input coupled to outputs of the first and the second amplitude processing block via respective first and second signal paths. The trigonometric processing block is configured to determine a magnitude value and a phase value based on signals at its first and second inputs.

The first compensation block is configured to store a value of the signal at the first input of the trigonometric processing block as a first peak value, when the phase value assumes a first phase reference value. Similarly, the first compensation block is configured to store the value of the signal at the first input of the trigonometric processing block as a second peak value, when the phase value assumes a second phase reference value. The first compensation block determines a first peak amplitude value based on a difference between the stored first and second peak values. The first compensation block further determines a first amplitude error based on a difference between the magnitude value and the first peak amplitude value, determines a first gain value by applying a first regulation function to the first amplitude error, and adjusts the gain of the first amplitude processing block based on the first gain value.

Similarly, the second compensation block is configured to store a value of the signal at the second input of the trigonometric processing block as a third peak value, when the phase value assumes a third phase reference value, and to store the value of the signal at the second input of the trigonometric processing block as a fourth peak value, when the phase value assumes a fourth phase reference value. The second compensation block determines a second peak amplitude value based on a difference between the stored third and fourth peak values, determines a second amplitude error based on a difference between the magnitude value and the second peak amplitude value, and determines a second gain value by applying a second regulation function to the second amplitude error. The second compensation block is further configured to adjust the gain of the second amplitude processing block based on the second gain value.

Accordingly, with adjusting the gains of the first and the second amplitude processing blocks, any misalignment between the first and the second input signal regarding their amplitude can be cancelled out or compensated for.

In some implementations the first and the second regulation function have an integral term only or have an integral term and a proportional term. For example, the first and the second regulation function $F_{R1,2}$ may be defined by $$F_{R1,2} = k_{1,2}\frac{z^{-1}}{1-z^{-1}},$$

wherein $k_{1,2}$ represents a proportional factor and $z^{-1}$ represents a unit delay.

In some implementations the signal processing arrangement further comprises a first offset combination element arranged in the first signal path and a second offset combination element arranged in the second signal path. The first offset combination element is configured to apply a first offset correction value to the first signal path, and the second offset combination element is configured to apply a second offset correction value to the second signal path.

In such implementations, the first compensation block is further configured to determine a first offset value based on a sum of the stored first and second peak values, and to determine the first offset correction value by applying a third regulation function to the first offset value. Similarly, the second compensation block is configured to determine a second offset value based on a sum of the stored third and fourth peak values, and to determine the second offset correction value by applying a fourth regulation function to the second offset value.

With such an implementation, also offset errors in the signal producing chain or, respectively, in the first and the second input signal, can be compensated for, thus further improving the linearity of an overall system.

For example, similarly to the first and the second regulation function, the third and the fourth regulation function $F_{R3,4}$ may be defined by $$F_{R3,4} = k_{3,4}\frac{z^{-1}}{1-z^{-1}},$$

wherein $k_{3,4}$ represents a proportional factor and $z^{-1}$ represents a unit delay.

In various implementations according to the improved concept the first and the second signal path each comprise an analog-to-digital converter for transforming the first and the second input signal from an analog domain to a digital domain, e.g. with an N-bit resolution. In such implementations, for example the trigonometric processing block and the first and the second compensation block operate in the digital domain, in particular with discrete operations. The trigonometric processing block may, for example, be implemented as a Coordinate Rotation Digital Computer, CORDIC, processing digital input values and outputting the magnitude value and the phase value as digital signals.

In such implementations with analog-to-digital converters, the first and the second offset combination element both may be arranged either before the analog-to-digital converters or after the analog-to-digital converters. In the latter case, the offset combination elements operate in a digital domain and directly provide the respective offset correction value to the digital signal in the associated signal path.

In the case that the offset combination elements are both arranged before the analog-to-digital converters, the offset combination elements effectively operate in the analog domain, such that the respective offset correction value is transformed to the analog domain by a respective digital-to-analog converter.

In some implementations, the signal processing arrangement according to the improved concept further comprises a phase compensation block arranged in the first and the second signal paths and configured to apply a phase correction to at least one of the first and the second signal paths. Accordingly, if there are any deviations from the ideal orthogonal relationship between the first and the second input signal, such deviations can be compensated by the phase correction. This further improves the linearity of the overall system.

For example, a phase compensation block is configured to apply the phase correction with respective delays to the first and/or the second signal path and to minimize an integrated product of signals after the respective delays in the first and the second signal path by controlling delay times of the respective delays.

Such an approach is based on the idea that the integrated product of the first and the second input signals or the signals derived thereof result in a zero value for ideally orthogonal signals in a defined integration interval. Hence, if there are any phase deviations, these will result in deviations in the integral value, which then can be used to control the amount of phase correction, i.e. the delay times of the respective delays.

For example, the product is integrated for one or more full rotations of the rotating object based on rotation information provided by the trigonometric processing block. For example, the trigonometric processing block provides trigger signals for start/stop times of one full rotation, e.g. based on determined phase values.

In some implementations, controlling of the delay times and integration of the product depend on a rotational speed of the rotating object based on rotation information provided by the trigonometric processing block. For example, the regulation for the phase correction is only allowed or executed if a rotational speed is determined to be more or less constant. For example, regulation may be stopped if the rotational speed deviates for more than a defined percentage during one full rotation.

In some implementations the signal processing arrangement further comprises a first and a second low pass filter arranged in the first and the second signal path before the inputs of the trigonometric processing block. For example, the low pass filters are placed immediately before the inputs of the trigonometric processing block such that e.g. the output signals of the low pass filter form the input for the trigonometric processing block. The low pass filters allow the cancellation of higher frequency components in the signals in the first and the second signal paths.

In various implementations the signal processing arrangement further comprises a chopping control configured to control signal chopping in at least the first and the second signal paths. Accordingly, in addition to other measures like amplitude regulation, offset regulation and phase regulation, also chopping can be applied to improve the linearity of the overall system.

In the description above the improved concept has been described on conjunction with specific structural elements. However, the idea underlying the improved concept can also be expressed with respective operations to be performed.

Accordingly, in a signal processing method according to the improved concept a first and a second input signal associated with a rotating object are processed. In particular, the first and the second input signals are amplified with a first and a second adjustable gain to generate a first and a second amplified signal. The first and the second amplified signal or respective signals derived thereof are taken as a first and a second trigonometric base signal. A magnitude value and a phase value are determined as a function of the first and the second trigonometric base signal.

A value of the first trigonometric base signal is stored as a first peak value, when the phase value assumes a first phase reference value. Similarly, a value of the first trigonometric base signal is stored as a second peak value, when the phase value assumes a second phase reference value.

Additionally, a value of the second trigonometric base signal is stored as a third peak value, when the phase value assumes a third phase reference value, and is stored as a fourth peak value, when the phase value assumes a fourth phase reference value.

A first peak amplitude value is determined based on a difference between the stored first and second peak values, and a second peak amplitude value is determined based on a difference between the stored third and fourth peak values. A first amplitude error is determined based on a difference between the magnitude value and the first peak amplitude value, and a second amplitude error is determined based on a difference between the magnitude value and the second peak amplitude value. A first gain value is determined by applying a first regulation function to the first amplitude error, and a second gain value is determined by applying a second regulation function to the second amplitude error. The first adjustable gain is adjusted based on the first gain value, and the second adjustable gain is adjusted based on the second gain value.

In some implementations of the signal processing method according to the improved concept, furthermore a first offset value is determined based on a sum of the stored first and second peak values, and a second offset value is determined based on a sum of the stored third and fourth peak values. A first offset correction value is determined by applying a third regulation function to the first offset value, and a second offset correction value is determined by applying a fourth regulation function to the second offset value. The first offset correction value is applied to the first amplified signal or a respective signal derived thereof, and the second offset correction value is applied to the second amplified signal or a respective signal derived thereof.

In some implementations a phase correction is applied to at least one of the first and the second amplified signal or to respective signals derived thereof.

For example, applying the phase correction comprises applying a delay with a first delay time to the first amplified signal or to the respective signal derived thereof in order to generate a first delayed signal, and applying a second delay with a second delaying time to the second amplified signal or to the respective signal derived thereof in order to generate a second delayed signal. An integrated product of the first and the second delayed signals is minimized by controlling the first and second delay times.

Further and more detailed implementations of the signal processing method according to the improved concept become readily apparent to the skilled reader from the description of the various implementations of the signal processing arrangement above.

Various implementations of the signal processing arrangement and/or the signal processing method may be used in a rotary encoder, for example together with respective sensors and sensor circuitry. Also magnetic sources like rotatable permanent magnets may be part of such a rotary encoder.

BRIEF DESCRIPTION OF THE DRAWINGS

The improved signal processing concept will be described in more detail below for several embodiments with reference to the drawings. Identical reference numerals designate elements or components with identical functions. In so far as elements or components correspond to one another in function, a description of them will not be repeated in each of the following figures.

In the figures.

DETAILED DESCRIPTION

Figure 1:
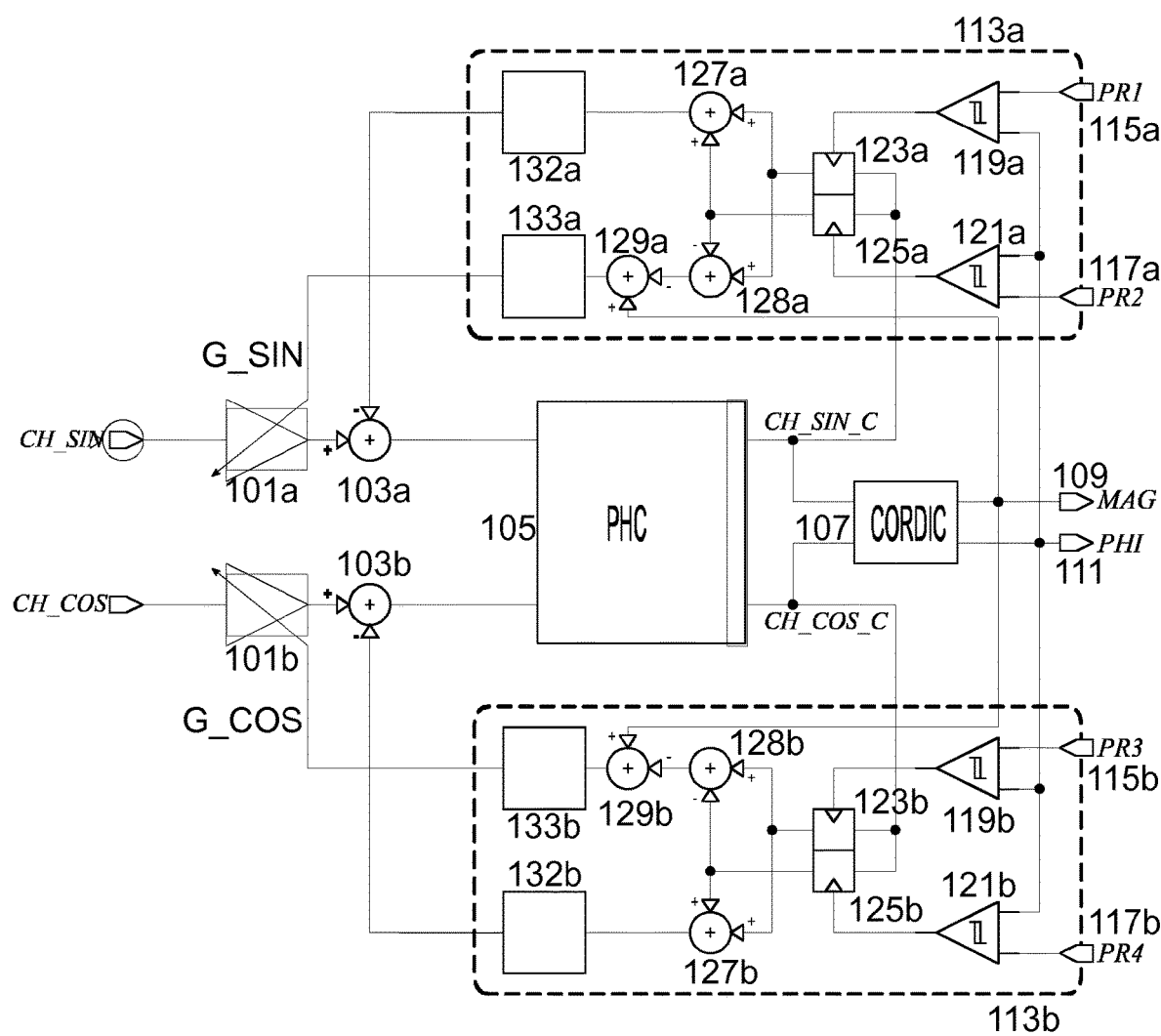
FIG. 1 shows an example embodiment of a signal processing arrangement.

FIG. 1 shows an example embodiment of a signal processing arrangement for processing a first input signal CH_SIN and a second input signal CH_COS associated with a rotating object. Such a signal processing arrangement can, for example, be used with sine-cosine based rotary encoders that produce an angular value based on the sine-shaped input signals. Sine-cosine based rotary encoders are built using a geometrical arrangement of magnetic field sensors like CMOS Hall elements on the device which, in conjunction with a permanent magnet or any other magnetic source rotated above them, allow the generation of two vectors with ideally 90° phase shift towards each other. The devices rely on the fact that sine and cosine channels have the same amplitude, no offset signal and no additional phase shift towards each other, which allows the calculation of the angle using the inverse tangent function:

$$\alpha = \tan^{-1}\left(\frac{CH_{SIN}}{CH_{COS}}\right) \quad (1)$$

In practice, due to known ambiguities in the calculation process, more sophisticated algorithms are used that, however, are still based on the inverse tangent function. For example, such calculations can be made with CORDIC processors.

According to the improved concept, it has been discovered that the assumption of the sine and cosine channels have the same amplitude, no offset signal and no additional phase shift towards each other is not suitable for practicable applications.

It has particularly been found out that, since each sensor has its own residual offset and sensitivity error in addition to the residual offset and gain variation of the signal chain after offset compensation schemes like auto-zeroing, current spinning or chopping are performed, this equation can be expanded to accommodate for these influences as follows:

$$\alpha = \tan^{-1}\left(\frac{V_{OFF,SIN} + (G + \Delta G_{SIN}) \cdot \sum_{HE_{SIN}}[V_{ROFF,HE_X} + B_{HE_X} \cdot I_{BIAS} \cdot (S_H + \Delta S_{HE_X})]}{V_{OFF,COS} + (G + \Delta G_{COS}) \cdot \sum_{HE_{COS}}[V_{ROFF,HE_X} + B_{HE_X} \cdot I_{BIAS} \cdot (S_H + \Delta S_{HE_X})]}\right) \quad (2)$$

Magnetic offset fields usually are suppressed by the geometrical arrangement of the sensors but due to gain variations in the Hall elements and the frontend amplifiers an offset error remains even after chopping and current spinning. This is expressed as follows:

$$V_{SIN}(\alpha)=(B_{MAGNET}\sin(\alpha)+B_{OFFSET})\cdot(G_{HE}+\Delta G)-\\(B_{MAGNET}\sin(\alpha+180°)+B_{OFFSET})\cdot G_{HE}V_{SIN}(\alpha)=\\B_{MAGNET}\sin(\alpha)\cdot(2\cdot G_{HE}+\Delta G)+B_{OFFSET}\cdot\Delta G \quad (3)$$

This equation (3) also shows that a sensitivity error or gain variation in one of the hall elements directly affects the overall gain of the channel.

In order to achieve an integrated nonlinear, INL, error of lower than 0.6° the channels have to match within ±2% or a maximum of ±1% of offset is allowed. Also, since gain variation and offset values shift over temperature and aging a calibration of these parameters during production is not overly effective.

Referring again to FIG. 1, the signal processing arrangement according to the improved concept provides measures to deal with each of three sources of non-linearity, namely amplitude errors, offset errors and phase shifts between the two input channels. Each of the three error sources is handled with an individual signal processing, which improves the non-linearity of the overall signal processing individually. E.g., the respective measures are combined in order to improve the effect of reducing non-linear errors. However, each measure may also be applied alone, as they do not directly depend on each other.

The signal processing arrangement has a first input for receiving the first input signal CH_SIN and a second input for receiving the second input CH_COS. A first and a second amplitude processing block 101a, 101b are connected to the first and the second signal input. Each of the amplitude processing blocks 101a, 101b has an individually adjustable gain G_SIN, G_COS. These adjustable gains are controlled from a first and a second compensation block 113a, 113b, the function of which will be explained later in more detail. However, the adjustable gain assures that both signal channels operate on the same amplitude, one of the prerequisites for having a high linearity in the overall system.

Downstream to the amplitude processing blocks 101a, 101b there are a first and a second offset combination element 103a, 103b arranged in a first, respectively second, signal path between the amplitude processing blocks 101a, 101b and a trigonometric processing block 107. The offset combination elements 103a, 103b are configured to provide a first respectively second offset correction value to the first and the second signal paths. In particular, the offset correction value is provided from the first and the second compensation block 113a, 113b as a respective result of an offset control that will be explained later in more detail. The offset correction allows to reduce any offsets present in the signal channels, thus further improving the linearity of the overall system.

A phase compensation block 105 is arranged in the first and the second signal path downstream to the offset combination elements 103a, 103b and has outputs that are connected to the inputs of the trigonometric processing block 107. Additionally, the outputs of the phase compensation block 105 are connected to the first and the second compensation block 113a, 113b.

As mentioned above, the trigonometric processing block 107 uses the signals at its inputs, namely a first trigonometric base signal CH_SIN_C and a second trigonometric base signal CH_COS_C, as a basis for calculating a magnitude value MAG and a phase value PHI, which represent an instantaneous definition of a vector spanned by the first and the second input signal CH_SIN, CH_COS, respectively their compensated versions CH_SIN_C, CH_COS_C. The magnitude value MAG and the phase value PHI are provided at respective outputs 109, 111. Their values are also provided to the first and the second compensation block 113a, 113b.

The trigonometric processing block 107 may also be present in conventional rotary encoders. However, in conventional implementations, the trigonometric processing block is directly connected to the signal inputs without amplitude processing, offset correction and phase correction.

According to the improved concept specific positions over one rotation are used to evaluate the peak-to-peak amplitude $V_{PP}$ and the offset of both channels individually, thus allowing the evaluation of the sine and cosine channel properties individually. To this end the first compensation block 113a comprises a first trigger element 119a and a second trigger element 121a that each have one input connected to the phase output 111 for receiving the actual phase value PHI. The other input of the first trigger element 119a is provided with a first phase reference PR1, and similarly, the other input of the second trigger embodiment 121a is provided with a second phase reference value PR2 at phase input 117a.

Accordingly, if the actual phase value PHI assumes or crosses the respective phase reference value PR1, PR2, a respective trigger signal is output by the first, respectively second trigger element 119a, 121a. The respective trigger outputs are connected to trigger inputs of a first and a second storage element 123a, 125a, which both have third inputs connected to the first input of the trigonometric processing block 107 for receiving the first trigonometric base signal CH_SIN_C. Once the respective trigger signal is received, the actual value of the trigonometric base signal CH_SIN_C is stored and output until the next triggering takes place.

The second compensation block 113b is formed similarly, respective reference numerals indicated with a "b" instead of an "a". It only differs in so far as the first trigger element 119b is provided with a third phase reference value PR3 and the second trigger element 121b receives a fourth phase reference value PR4. Furthermore, the triggered storage elements 123b and 125b have their inputs commonly connected to the second input of the trigonometric processing block 107 for receiving the second trigonometric base signal CH_COS_C.

Figure 2:
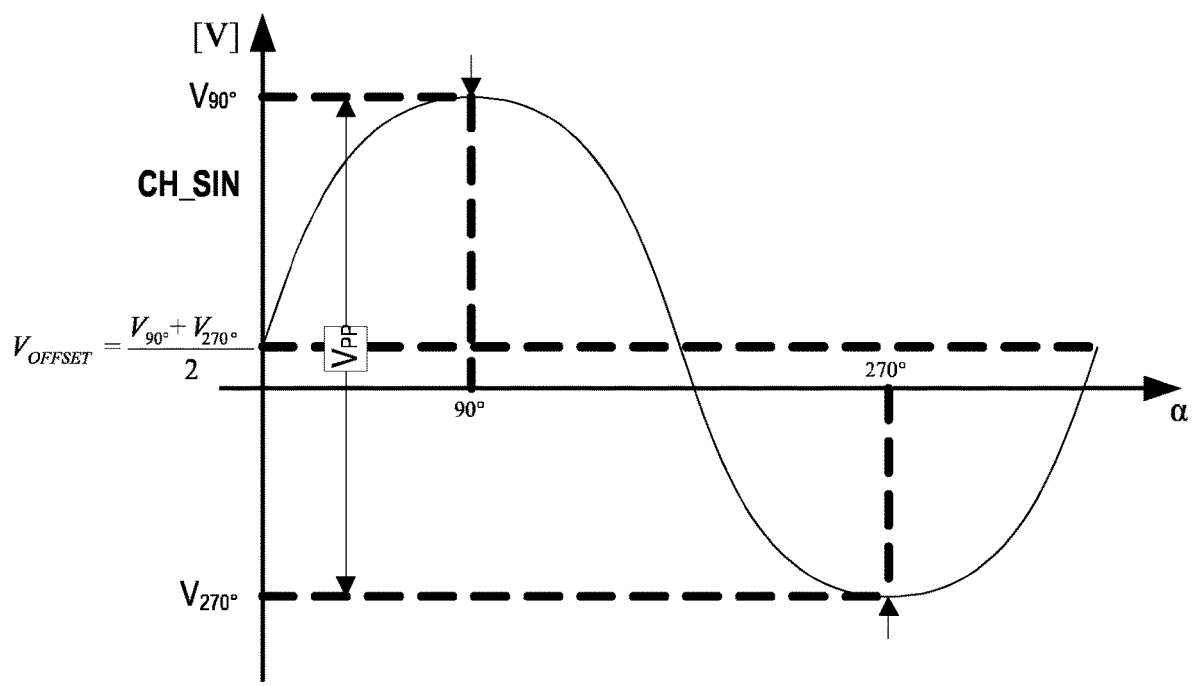
FIG. 2 shows signal diagrams of example signals to be processed.
Figure 2:
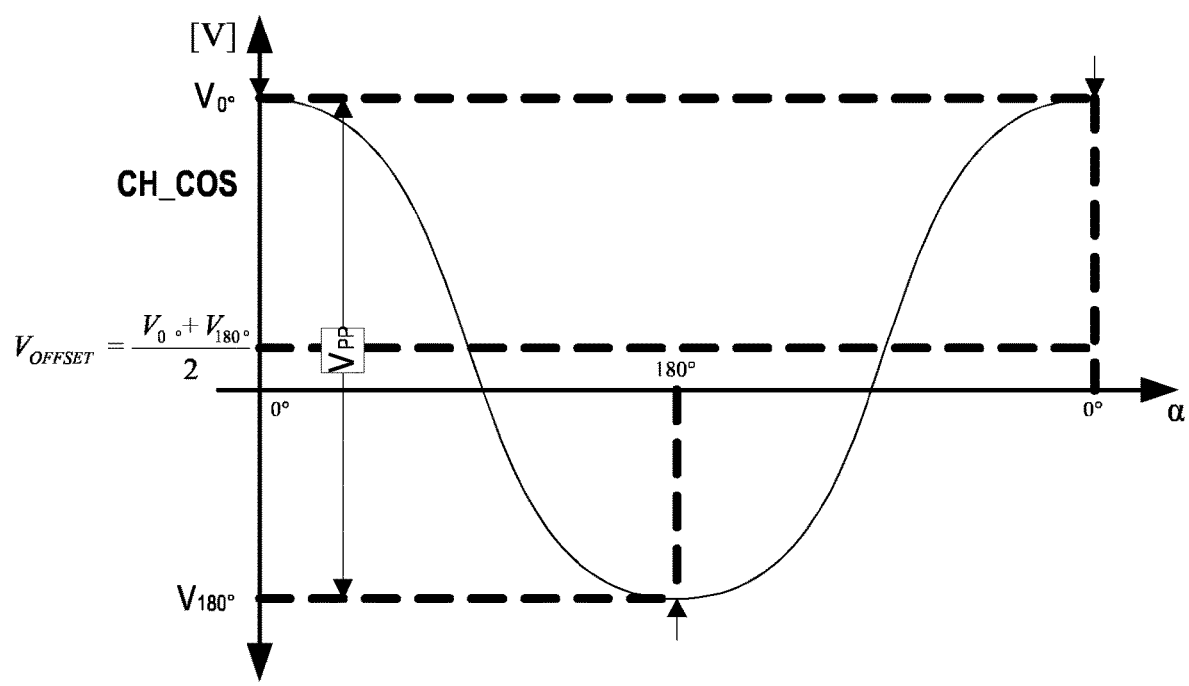

Referring to FIG. 2, two example signal diagrams are shown, the upper one for the first channel CH_SIN and the lower one for the second channel CH_COS. The two signals may have slightly different amplitudes and each have an example offset deviating from an ideal zero offset. The first signal is sine-shaped, the second signal is cosine-shaped. As can be seen from signal diagrams, respective offsets $V_{OFF,CH_{SIN}}$ and $V_{OFF,CH_{COS}}$ for each of the signals can be calculated by using the sum of the peak values, which is at the phase of 90° and 270° for the first signal, and is at 0° and 180° for the second signal, resulting in $$V_{OFF,CH_{SIN}} = \frac{V_{SIN}(90°) + V_{SIN}(270°)}{2} \quad (4)$$

and $$V_{OFF,CH_{COS}} = \frac{V_{COS}(0°) + V_{COS}(180°)}{2}. \quad (5)$$

The peak values can also be used to calculate the absolute amplitude $V_{SIG}$ of the sine-shaped signals, in particular by using the peak-to-peak value $V_{PF}$, which can be calculated according to the following equations:

$$V_{SIG,CH_{SIN}} = \frac{V_{SIN}(90°) - V_{SIN}(270°)}{2} \quad (6)$$

and $$V_{SIG,CH_{COS}} = \frac{V_{COS}(0°) - V_{COS}(180°)}{2}. \quad (7)$$

The proposed phase values 90° and 270°, respectively 0° and 180°, for calculating the offset and the amplitude allow the easiest calculation due to the nature of the sine, respectively cosine, signals. However, the respective calculations could also be performed at different phase angles, which is apparent for the skilled reader from the known nature of sine-cosine based signals.

However, referring again to FIG. 1 and taking the phase values from FIG. 2, the first phase reference value PR1 would be 90°, the second phase reference value PR2 would be 270°, the third phase reference value PR3 would be 0° and the fourth phase reference value PR4 would be 180°.

Referring back to FIG. 1, a peak-to-peak amplitude value VPP is calculated in summation element 128a by forming the difference between the stored first and second peak values from storage elements 123a and 125a. The output of the summation element 128a is a first peak amplitude value that is subtracted from the actual magnitude value MAG in element 129a, resulting in a first amplitude error. The first amplitude error is provided to block 133a which applies a first regulation function to the first amplitude error for determining a first gain value. The first gain value is used to adjust the adjustable gain of the first amplitude processing block 101a.

A similar calculation is performed in the second compensation block 113b with elements 128b, 129b and 133b, which determine a second peak amplitude value, a second amplitude error and a second gain value by applying a second regulation function to the second amplitude error, respectively. The second gain value is used to adjust the gain of the second amplitude processing block 101b.

As described above, the offset of the signals can be determined based on equations (4) and (5). To this end, summation element 127a determines a first offset value based on a sum of the first and second peak values from storage elements 123a and 125a. A first offset correction value is determined in block 132a by applying a third regulation function to the first offset value. The first offset correction value is applied to the first signal path with the first offset combination element 103a, as described above.

In a similar fashion, element 127b determines a second offset value based on a sum of the stored third and fourth peak values from storage elements 123b and 125b. In block 132b a second offset correction value is determined by applying a fourth regulation function to the second offset value, which is then provided to the second offset combination element 103b for being applied to the second signal path.

The phase correction in the phase compensation block 105 will be explained later in more detail in conjunction with FIG. 4.

The implementation shown in FIG. 1 describes the improved signal processing concept on a block level, leaving room for specific implementations of the single elements. Furthermore, any potential transitions from an analog signal domain to a digital signal domain are left out for the purpose of a better overview. However, at least the trigonometric processing block 107 and the compensation blocks 113a, 113b preferably operate in the digital domain.

By application of the improved concept, also non-linearities of the magnetic source or sensitivity errors of the Hall elements or other magnetic field sensors can be compensated for. Additionally, as the signal processing arrangement also operates during normal operation of a rotary encoder, also lifetime drifts of any components can be compensated for.

Figure 3:
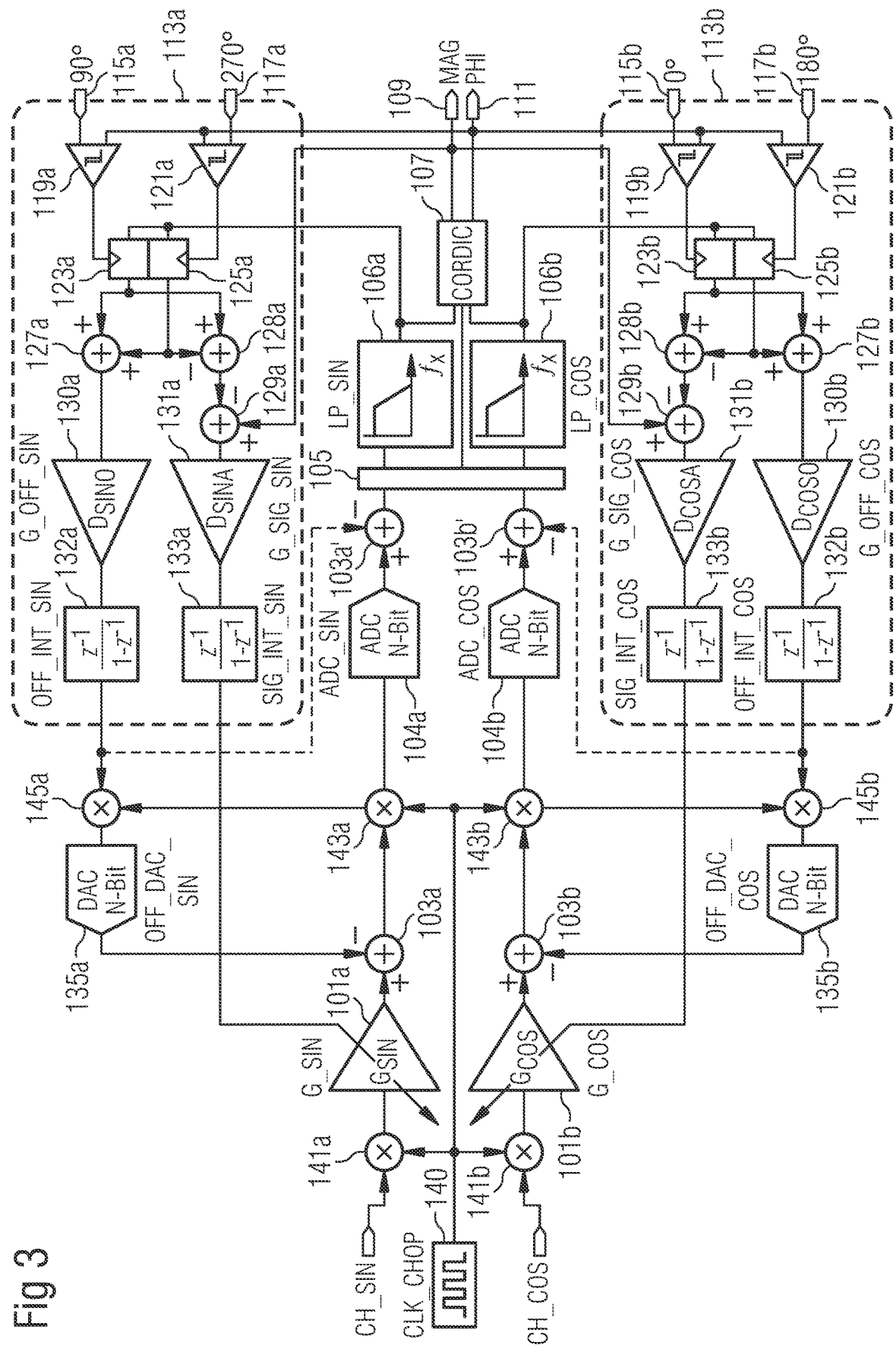
FIG. 3 shows a further example implementation of a signal processing arrangement.

Referring now to FIG. 3, an example implementation is shown which is based on the implementation shown in FIG. 1. In particular, FIG. 3 constitutes a more specific implementation of the basic implementation shown in FIG. 1. However, as discussed before for FIG. 1, each of the three compensation schemes, namely amplitude control, offset control and phase control can be used or omitted individually. Reasons for the omission may be limited resources or limited implementation space when integrating the signal processing arrangement in an integrated circuit.

In the following, only the differences to the implementation shown in FIG. 1 will be explained in detail. For the common functions it is referred to the description of FIG. 1. For example, in the first and the second compensation block 113a, 113b the implementation of the regulation functions are depicted more specifically. For determining the first and the second gain value, respective additional amplifiers 131a, 131b are included between elements 129a, 129b and blocks 133a, 133b. These elements apply a multiplication factor $D_{SINA}$ in the first compensation block 113a and $D_{COSA}$ in the second compensation block 113b.

In a similar fashion, also in the respective regulation paths for determining the first and the second offset correction value, respective amplification blocks 130a, 130b with amplification factors $D_{SINO}$ and $D_{COSO}$ are present. The regulation functions $F_{R1,2,3,4}$ in blocks 132a, 132b and 133a, 133b are of the form $$F_{R1,2,3,4} = k_{1,2,3,4} \frac{z^{-1}}{1 - z^{-1}}. \quad (8)$$

Accordingly, each of the regulation functions $F_{R1,2,3,4}$ has an integral term and a proportional term, resulting in a PI regulation.

By choosing the parameters accordingly, also regulation functions having an integral term only can be achieved. More generally speaking, various types of regulation functions could be used. However, the regulation functions in blocks 132a and 132b should be of equal nature and the regulation functions in blocks 133a and 133b should be of equal nature.

As can be seen from FIG. 3, the application of the offset correction value can be performed at two exclusive positions, namely either before respective analog-to-digital converters 104a, 104b in the analog signal domain with offset combination elements 103a, 103b, or, alternatively after the analog-to-digital converters 104a, 104b with offset combination elements 103a', 103b' in the digital domain. If the offset correction value is applied in the analog domain, digital signals provided by the compensation blocks 113a, 113b need to be converted back to the analog domain with respective digital-to-analog converters 135, 135b.

For example, the analog-to-digital converters 104a, 104b provide an N-bit digital value, which will be the basis for phase correction and trigonometric processing in block 107. Low pass filters 106a, 106b may be present between the optional phase compensation block 105 and the trigonometric processing block 107 for filtering out unwanted high frequency portions.

FIG. 3 further shows that in parallel to the three compensation concepts, amplitude, offset and phase, also chopping of the signals to be processed can be applied. To this end, the example implementation of FIG. 3 includes a chopping control comprising a chopping clock 140 and chopping modulators 141a, 141b, 143a, 143b and 145a, 145b receiving a chopping clock signal CLK_CHOP from the chopping clock 140. With the provision of the clock signal CLK_CHOP the polarity of the respective signals at the modulation position can be influenced, respectively altered, with each transition of the clock signal CLK_CHOP.

By doing so it is possible to distinguish between the wanted signal components residing on the clock signal CLK_CHOP frequency and the offset of the processing channels, which basically stays constant. After demodulation respectively de-chopping in modulators 143a, 143b and digital filtering with filters 106a, 106b, the offset is removed to a great extent and only a small portion remains, which is further reduced by the proposed offset compensation concept.

The chopping modulators 141a, 141b can also be integrated in the sensor system itself, like geometrical spinning or current spinning of the Hall element by changing the current direction in the Hall plane.

Figure 4:
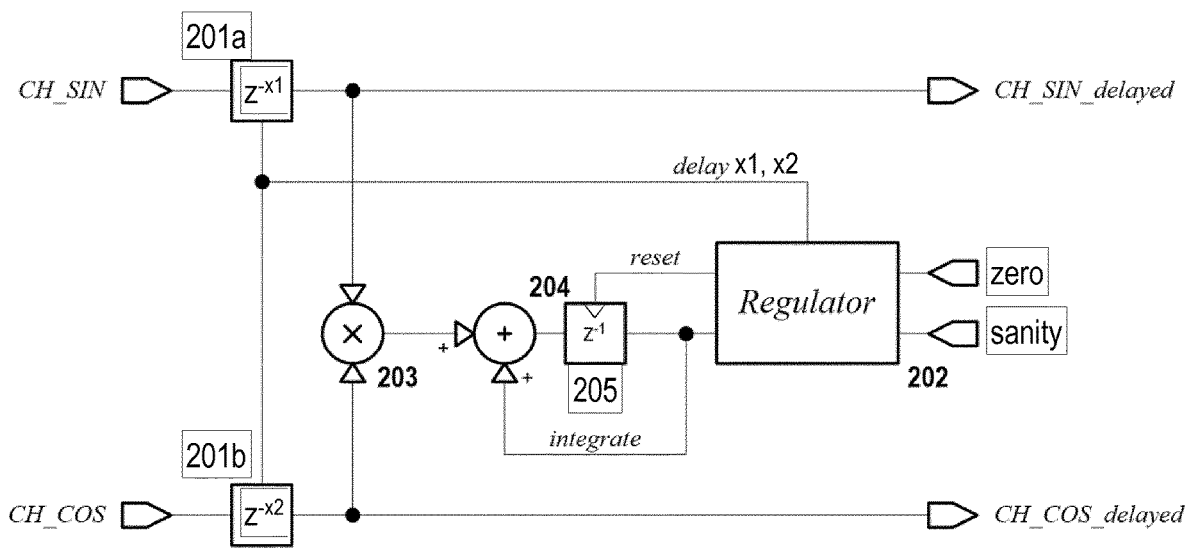
FIG. 4 shows an example embodiment of a phase compensation block.

Referring now to FIG. 4, a schematic block diagram of an example implementation of a phase compensation block 105 is shown. In order to keep the example general, the first and the second input signal CH_SIN, CH_COS are used as input signals for the phase compensation block. However, also derivatives of these input signals can be applied at the inputs, which is apparent from the description of FIG. 1 and FIG. 3.

The inputs are connected to respective delay elements 201a, 201b which apply a respective delay x1, x2 to the associated signal path. Accordingly, the outputs of said delay elements 201a, 201b are delayed versions CH_SIN_delayed, CH_COS_delayed. The respective delays x1, x2 are controlled by a regulator 202, whose function is explained in more detail in the following. The delay in the delay elements 201a, 201b is denoted with the discrete time expression $z^{-x1}$, $z^{-x2}$ respectively.

A summation element 203 forms the product of the two delayed signals CH_SIN_delayed and CH_COS_delayed which is provided to an integrator formed of a summation element 204 and a unit delay element 205, which at its output provides the actual integration value to the regulator 202. The regulator 202 is configured to provide a reset signal to the unit delay 205, thus determining the integration interval between two subsequent reset pulses. For example, such an integration period corresponds to one or more full rotations of the rotating object. The rotation information is provided to the regulator 202, e.g. via the input "zero" from the trigonometric processing block, indicating a predefined rotation angle.

In other words, the input to the regulator 202 is the remaining value after integrating the product of both sine and cosine for one or more rotation periods. Ideally, this integrated product should be 0 for 90° phase shift between the two signals. The sign of the remaining value after integration indicates whether sine or cosine is lagging, whereas the value in relation to the rotational speed indicates the phase shift.

$$D_{REG} = \hat{B}^2 \cdot \int_0^{2\pi} \sin(\alpha + \Delta\alpha) \cdot \cos(\alpha), dx = \hat{B}^2 \cdot \pi \cdot \sin(\Delta\alpha) \quad (9)$$

For very small errors in $\Delta\alpha$, equation (5) can also be approximated as:

$$D_{REG} \approx \hat{B}^2 \cdot \pi \cdot \Delta\alpha \quad (10)$$

Since the magnitude value MAG is known from the trigonometric processing block 107 and/or due to the gain control loop, the equation only contains one unknown which is the phase difference between first and second signal path, e.g. sine and cosine. The regulation loop tries to bring this value down to zero by adjusting the delays in either the first or the second signal path depending on the sign and value of the integrated value. By allowing longer monitoring time and limiting the feedback to just increment and decrement steps the dependency of speed and amplitude disappear as well.

It should be noted that the regulation primarily depends on the difference between the delays x1, x2. Accordingly, a common offset delay may be included in both delays x1, x2 allowing, for example, to keep one of the delays constant and only influencing or controlling the other one, both in positive and negative direction, whatever is necessary to minimize the integrated product.

The regulator 202 may have an optional control input denoted as a "sanity" input, which allows to suspend the regulation. For example, a respective suspension signal may be provided by an evaluation block that monitors the rotational speed of the rotating object. If the rotation speed changes more than a given threshold or a given percentage during one rotation period, the integration result for the integrated product may not be sufficiently correct, which would lead to undesired effects in the regulation. Hence, the regulation can be suspended in such situations and continued again if the integration result can be assumed reliable again. More generally speaking, controlling of the delay times x1, x2 and integration of the product can be made dependent on a rotational speed of the rotating object based on rotation information provided by the trigonometric processing block 107.

Figure 5:
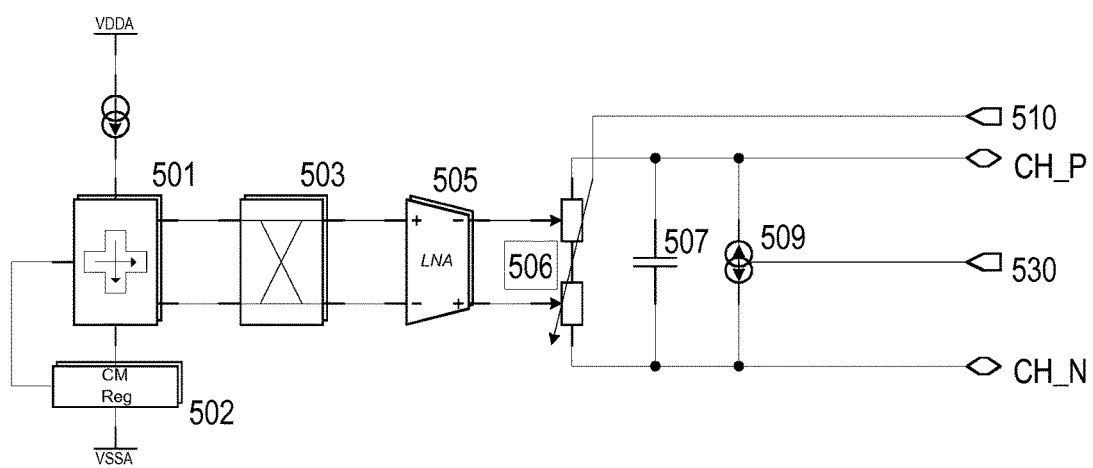
FIG. 5 shows an example implementation detail of a signal processing arrangement.

Referring now to FIG. 5, an example implementation of a detail of a rotary encoder and a part of the signal processing arrangement are shown. In particular, FIG. 5 shows an example magnetic field sensor 501, e.g. a Greek cross-shaped Hall sensor, which is operated with a common mode regulation 502 in order to provide a sensing value as a differential signal to a chopping element 503. An output of the chopping element 503 is connected to a low noise amplifier in the form of a transconduction amplifier 505. Outputs of the amplifier 505 are connected to a pair of adjustable resistors 506 that are connected between output signal terminals CH_P, CH_N for providing a differential signal. Additionally, a stabilizing capacitor 507 is connected between the signal terminals CH_P, CH_N, together with a bipolar current source 509 controlled depending on a signal at terminal 530. The pair of resistors 506 is controlled depending on a signal at terminal 510.

For example, by adjusting the pair of resistors 506 via terminal 510, a transmission gain between the amplifier 505 and the signal terminal CH_P, CH_N can be controlled. For example, referring to FIG. 1 and/or FIG. 3, the resistor pair 506 can implement the function of the first and/or second amplitude processing block 101a, 101b, if the respective gain value is provided at terminal 510. In particular, the tappings of the resistor pair 506, to which the amplifier 505 is connected, can be controlled based on the respective gain value. The tappings preferably are symmetrical.

The current source 509 can be used to implement the function of the respective offset combination element 103a, 103b, controlled by the respective offset correction value provided at terminal 530. Such a configuration assures that the noise performance remains constant even for different settings of gain value and offset correction value. It should be further noted that although this implementation is shown as a differential signal implementation, also a single-ended implementation could be made.

The invention claimed is:

1. A signal processing arrangement, comprising
a first and a second signal input for receiving a first and a second input signal associated with a rotating object;
a first and a second amplitude processing block connected to the first and the second signal input, the first and the second amplitude processing block each having an adjustable gain;
a trigonometric processing block having a first and a second input coupled to outputs of the first and the second amplitude processing block via respective first and second signal paths, the trigonometric processing block being configured to determine a magnitude value and a phase value based on signals at its first and second inputs;
a first compensation block being configured
to store a value of the signal at the first input of the trigonometric processing block as a first peak value, when the phase value assumes a first phase reference value;
to store the value of the signal at the first input of the trigonometric processing block as a second peak value, when the phase value assumes a second phase reference value;
to determine a first peak amplitude value based on a difference between the stored first and second peak values;
to determine a first amplitude error based on a difference between the magnitude value and the first peak amplitude value;
to determine a first gain value by applying a first regulation function to the first amplitude error; and
to adjust the gain of the first amplitude processing block based on the first gain value; and
a second compensation block being configured
to store a value of the signal at the second input of the trigonometric processing block as a third peak value, when the phase value assumes a third phase reference value;
to store the value of the signal at the second input of the trigonometric processing block as a fourth peak value, when the phase value assumes a fourth phase reference value;
to determine a second peak amplitude value based on a difference between the stored third and fourth peak values;
to determine a second amplitude error based on a difference between the magnitude value and the second peak amplitude value;
to determine a second gain value by applying a second regulation function to the second amplitude error; and
to adjust the gain of the second amplitude processing block based on the second gain value.

2. The signal processing arrangement according to claim 1, wherein the first and the second regulation function have an integral term only or have an integral term and a proportional term.

3. The signal processing arrangement according to claim 1, further comprising
a first offset combination element arranged in the first signal path and configured to apply a first offset correction value to the first signal path; and
a second offset combination element arranged in the second signal path and configured to apply a second offset correction value to the second signal path; wherein
the first compensation block is configured to determine a first offset value based on a sum of the stored first and second peak values; and
to determine the first offset correction value by applying a third regulation function to the first offset value; and
the second compensation block is configured
to determine a second offset value based on a sum of the stored third and fourth peak values;
to determine the second offset correction value by applying a fourth regulation function to the second offset value.

4. The signal processing arrangement according to claim 3, wherein the first and the second signal path each comprise an analog-to-digital converter, and wherein the first and the second offset combination elements are both arranged either before the analog-to-digital converters or after the analog-to-digital converters.

5. The signal processing arrangement according to claim 1, wherein the first and the second signal path each comprise an analog-to-digital converter.

6. The signal processing arrangement according to claim, further comprising a phase compensation block arranged in the first and the second signal path and configured to apply a phase correction to at least one of the first and the second signal path.

7. The signal processing arrangement according to claim 6, wherein the phase compensation block is configured to apply the phase correction with respective delays to the first and/or the second signal path and to minimize an integrated product of signals after the respective delays in the first and the second signal path by controlling delay times of the respective delays.

8. The signal processing arrangement according to claim 7, wherein the product is integrated for one or more full rotations of the rotating object based on rotation information provided by the trigonometric processing block.

9. The signal processing arrangement according to claim 7, wherein controlling of the delay times and integration of the product depend on a rotational speed of the rotating object based on rotation information provided by the trigonometric processing block.

10. The signal processing arrangement according to claim 1, further comprising a first and a second low pass filter arranged in the first and the second signal path before the inputs of the trigonometric processing block.

11. The signal processing arrangement according to claim 1, further comprising a chopping control configured to control signal chopping in at least the first and the second signal path.

12. A signal processing method performed by a rotary encoder for processing a first and a second input signal associated with a rotating object, the method comprising:

amplifying the first and the second input signal with a first and a second adjustable gain to generate a first and a second amplified signal;
using the first and the second amplified signal or respective signals derived thereof as a first and a second trigonometric base signal;
determining a magnitude value and a phase value as a function of the first and the second trigonometric base signal;
storing a value of the first trigonometric base signal as a first peak value, when the phase value assumes a first phase reference value;
storing a value of the first trigonometric base signal as a second peak value, when the phase value assumes a second phase reference value;
storing a value of the second trigonometric base signal as a third peak value, when the phase value assumes a third phase reference value;
storing a value of the first trigonometric base signal as a fourth peak value, when the phase value assumes a fourth phase reference value;
determining a first peak amplitude value based on a difference between the stored first and second peak values;
determining a second peak amplitude value based on a difference between the stored third and fourth peak values;
determining a first amplitude error based on a difference between the magnitude value and the first peak amplitude value;
determining a second amplitude error based on a difference between the magnitude value and the second peak amplitude value;
determining a first gain value by applying a first regulation function to the first amplitude error;
determining a second gain value by applying a second regulation function to the second amplitude error;
adjusting the first adjustable gain based on the first gain value; and
adjusting the second adjustable gain based on the second gain value, wherein adjusting the first and second adjustable gains cancels out or compensates for a misalignment between amplitudes of the first and second input signals.

13. The method according to claim 12, further comprising
determining a first offset value based on a sum of the stored first and second peak values;
determining a second offset value based on a sum of the stored third and fourth peak values;
determining a first offset correction value by applying a third regulation function to the first offset value;
determining a second offset correction value by applying a fourth regulation function to the second offset value;
applying the first offset correction value to the first amplified signal or a respective signal derived thereof; and
applying the second offset correction value to the second amplified signal or a respective signal derived thereof.

14. The method according to claim 12, further comprising
applying a phase correction to at least one of the first and the second amplified signal or respective signals derived thereof.

15. The method according to claim 14, wherein applying the phase correction comprises
applying a first delay with a first delay time to the first amplified signal or to the respective signal derived thereof in order to generate a first delayed signal;
applying a second delay with a second delay time to the second amplified signal or to the respective signal derived thereof in order to generate a second delayed signal; and
minimizing an integrated product of the first and second delayed signals by controlling the first and second delay times.

16. The method according to claim 15, wherein the product is integrated for one or more full rotations of the rotating object based on rotation information.

17. The method according to claim 15, wherein controlling of the delay times and integration of the product depend on a rotational speed of the rotating object based on rotation information.

18. The method according to claim 12, wherein the first and the second regulation function have an integral term only or have an integral term and a proportional term.

\* \* \* \* \*